United States Patent [19]

Hynes

[11] 4,196,880

[45] Apr. 8, 1980

[54] HOLDER FOR PLASTIC TRASH BAG

[76] Inventor: Frederick B. W. Hynes, 8788 E. Thunderbird Ct., Parker, Colo. 80134

[21] Appl. No.: 9,830

[22] Filed: Feb. 2, 1979

[51] Int. Cl.² ........................ B65B 67/04; F16B 39/22

[52] U.S. Cl. ........................................ 248/99; 150/51; 248/95; 312/4

[58] Field of Search ..................... 248/95, 99, 101, 97, 248/100; 15/257.1; 150/51, 49, 48, 7, 3, DIG. 1; 312/4, 5, 6; 297/441

[56] References Cited

U.S. PATENT DOCUMENTS

| | | | |
|---|---|---|---|
| 1,569,406 | 1/1926 | Sonntag | 312/5 |
| 1,706,873 | 3/1929 | Date | 312/4 |
| 2,235,182 | 3/1941 | Weston | 248/100 |
| 2,451,829 | 10/1948 | Hightower | 248/100 |
| 2,639,110 | 5/1953 | Nicolas | 248/99 |
| 3,132,794 | 5/1964 | Frazier | 248/99 X |
| 3,235,306 | 2/1966 | Chernivsky | 297/441 X |
| 3,502,291 | 3/1970 | Ackerman et al. | 248/97 |
| 3,716,938 | 2/1973 | Ammons | 150/49 X |
| 3,744,081 | 7/1973 | Miller | 15/257.1 |
| 4,006,928 | 2/1977 | Beugin | 248/99 |

FOREIGN PATENT DOCUMENTS

| | | | |
|---|---|---|---|
| 734223 | 5/1966 | Canada | 150/3 |
| 633415 | 7/1936 | Fed. Rep. of Germany | 248/95 |

*Primary Examiner*—James T. McCall

*Attorney, Agent, or Firm*—Clarence A. O'Brien; Harvey B. Jacobson

[57] ABSTRACT

First and second generally U-shaped frame sections each including a pair of generally parallel arms interconnected at one pair of corresponding base ends by means of a connecting structure extending and connected therebetween are provided. The first frame section includes structure for support from a vertical support surface with at least the opposite ends of the connecting structure spaced outwardly from the support surface and the other pair of free ends of the arms projecting horizontally outwardly away from the support surface. The arms of the second section are resiliently urged toward slightly outwardly divergent positions and yieldable inwardly toward each other into substantially parallel positions aligned with the free ends of the arms of the first section. The free ends of the first and second section arms include portions thereof telescopingly engaged with each other and frictionally retained in relatively telescoped positions by the resiliency of the second section arms tending to return to their static outwardly divergent positions. When the sections are extended relative to each other, subsequent to the open end of a plastic bag being disposed thereover, the open end of the plastic bag is stretched slightly and firmly supported from the extended frame sections with the frame sections maintaining the mouth of the bag in a fully open position.

11 Claims, 7 Drawing Figures

HOLDER FOR PLASTIC TRASH BAG

BACKGROUND OF THE INVENTION

Various forms of trash bag and other flexible receptacle holders have been herefore provided. However, most of these holders have been specifically designed for holding relatively strong paper bags or fabric sacks and do not include structure adapting them for efficient support of relatively thin plastic trash bags. Accordingly, a need exists for a holder for plastic trash bags which may be conveniently mounted, for example, on a vertical wall surface above a supportive floor surface and which may be utilized to support the open upper end of a relatively fragile plastic trash bag in a secure manner without tearing the plastic bag. Examples of previously known forms of trash bag holders and the like are disclosed in U.S. Pat. Nos. 1,717,717, 2,162,113, 2,235,182, 2,423,325, 2,451,829 and 3,313,504.

BRIEF DESCRIPTION OF THE INVENTION

The trash bag holder of the instant invention inludes a pair of U-shaped half frame sections and one of the frame sections includes structure anchored relative thereto for support from a vertical support surface in spaced relation relative thereto. The frame sections each include a pair of generally parallel arms interconnected at their base ends by means of a bight portion extending therebetween. The second frame section is somewhat resilient and the free ends of its arms are slightly outwardly divergent and yieldingly displaceable toward each other into substantially parallel positions. The free ends of the arms of the first section include parallel sleeve portions supported therefrom into which the free ends of the arms of the second section may be telescoped when the second section arms are yieldingly biased toward each other into parallel positions. In this manner, the two half sections may be telescoped relative to each other and they are held in relatively adjusted positions by the resiliency of the second frame section tending to biasing the free ends of the arms thereof into their static outwardly divergent positions.

The main object of this invention is to provide a trash bag holder specifically designed to support a relatively fragile plastic trash bag therefrom.

Another object of this invention, in accordance with the immediately preceding object, is to provide a trash bag holder which may be readily mounted upon a suitable vertical support surface in a manner such that the bag supported therefrom will extend downwardly along and be spaced slightly outwardly of the support surface.

Still another object of this invention is to provide a trash bag holder which may be adjusted so as to be readily adaptable for use in conjunction with trash bags of different sizes.

Another important object of this invention is to provide a trash bag holder including a closure portion whereby the upper open end of the trash bag supported therefrom may be temporarily closed.

A final object of this invention to be specifically enumerated herein is to provide a trash bag holder in accordance with the preceding objects and which will conform to conventional forms of manufacture, be of simple construction and easy to use so as to provide a device that will be economically feasible, long lasting and relatively trouble free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
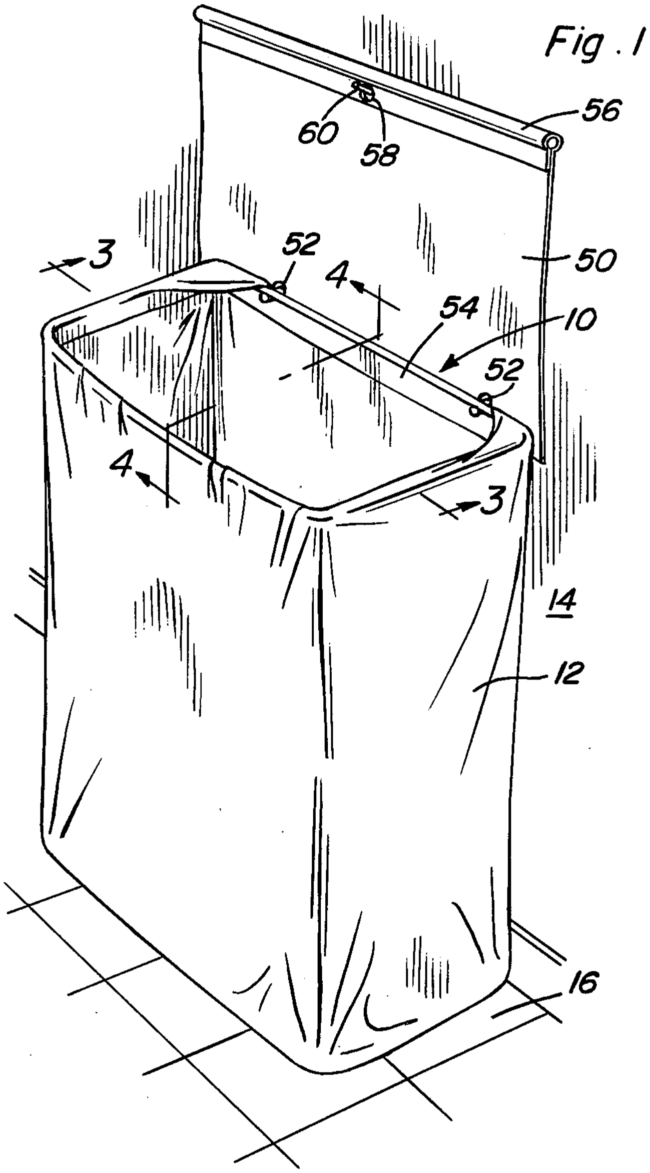
FIG. 1 is a perspective view of the trash bag holder of the instant invention supported in operative association relativ to a vertical support surface and with a plastic trash bag supported therefrom, the holder also having a trash bag closure operatively associated therewith in an open position.
Figure 2:
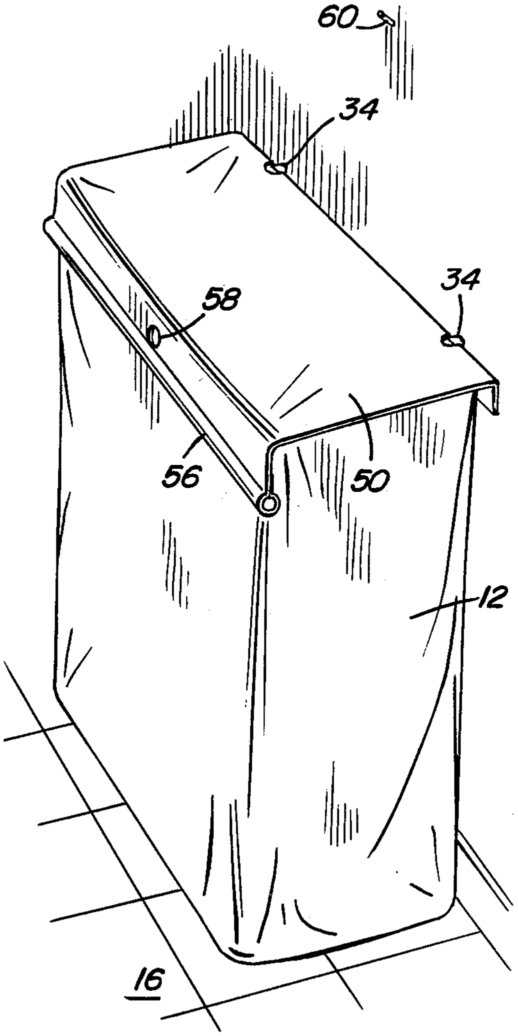
FIG. 2 is a perspective view similar to FIG. 1 but with the trash bag closure in the closed position.
Figure 5:
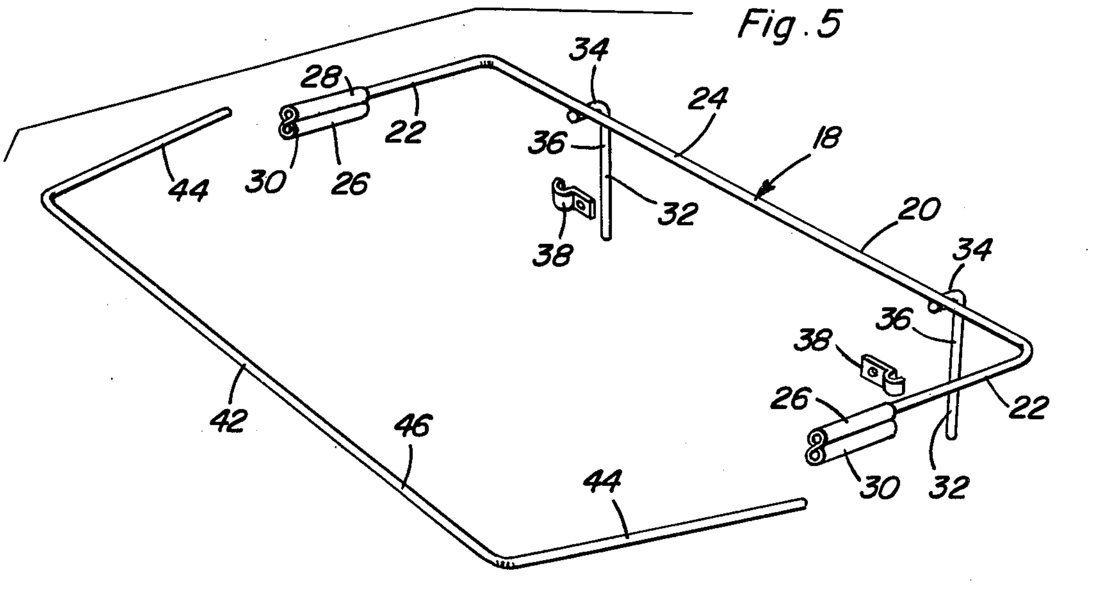
FIG. 5 is an exploded perspective view of the trash bag holder with the bag closure thereof omitted.

Referring now more specifically to the drawings, the trash bag holder of the instant invention is referred to in general by the reference numeral 10 and has a plastic trash bag 12 operatively associated therewith in FIGS. 1 and 2 of the drawings for support of the trash bag 12 from a vertical wall 14 and upon a floor structure 16. The trash bag holder 10 includes a frame assembly referred to in general by the reference numeral 18, see FIG. 5, including a first U-shaped section 20 comprising a pair of parallel arms 22 interconnected at their base ends by means of a bight portion 4 extending and secured therebetween. The free ends of the arms 22 have double sleeves 26 supported therefrom. Each double sleeve 26 includes a pair of side-by-side sleeve sections 28 and 30 and the sleeve sections 28 are telescoped and secured on the free ends of the arms 22. A pair of inverted L-shaped mounting brackets 32 are provided including upper horizontal short legs 34 and vertical long legs 36. The upper horizontal short legs 34 are secured, as by welding, to opposite end portions of the bight portion 24 beneath the latter and in a manner such that the long vertical legs 36 are spaced rearwardly of the rear side of the first frame section 20, the arms 22 projecting in a forward direction.

A pair of mounting clips 38 are provided and are secured to the wall 14 by fasteners 40 and the clips 38 support the brackets 32 from the wall 14 for vertical adjustment of the brackets 32 and thus the first section 20 relative to the wall 14.

The frame 18 includes a second frame section 42 including a pair of generally parallel arms 44 interconnected at their base ends by means of an integral bight portion 46. While the arms 44 are generally parallel, they are outwardly divergent from the bight portion 46.

Figure 6:
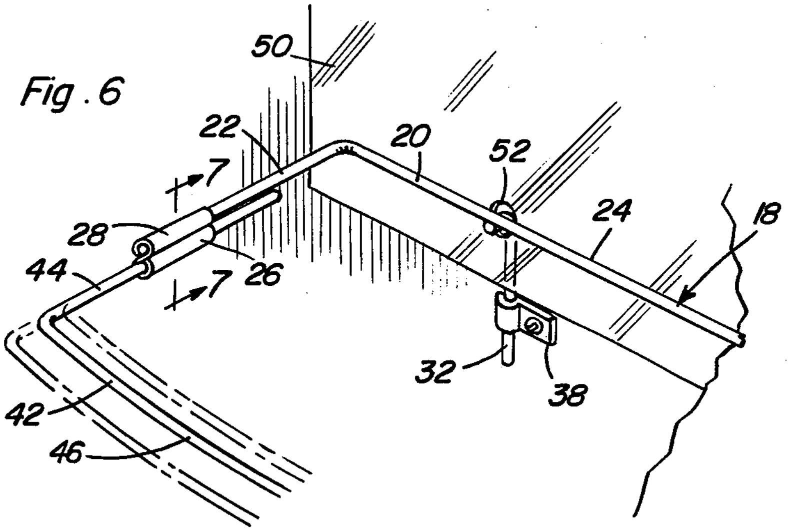
FIG. 6 is a fragmentary enlarged perspective view similar to the upper left-hand portion of FIG. 1 but with the associated trash bag omitted and alternate adjusted positions of the frame of the trash bag holder illustrated in phantom lines.
Figure 7:
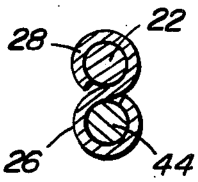
Figure 3:
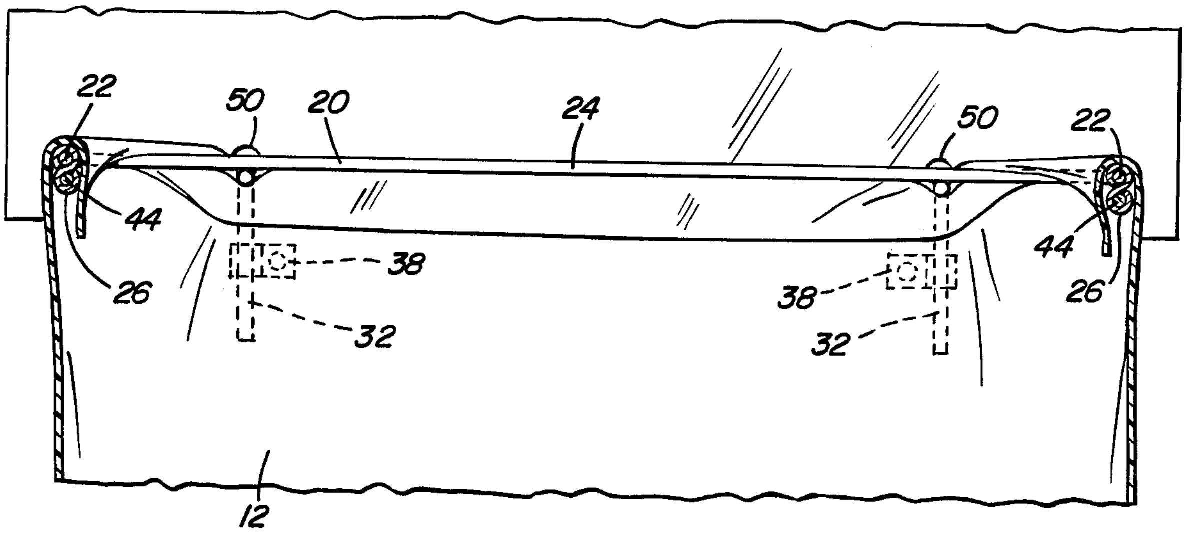
FIG. 3 is a enlarged fragmentary vertical sectional view taken substantially upon the plane indicated by the section line 3—3 of FIG. 1.
Figure 4:
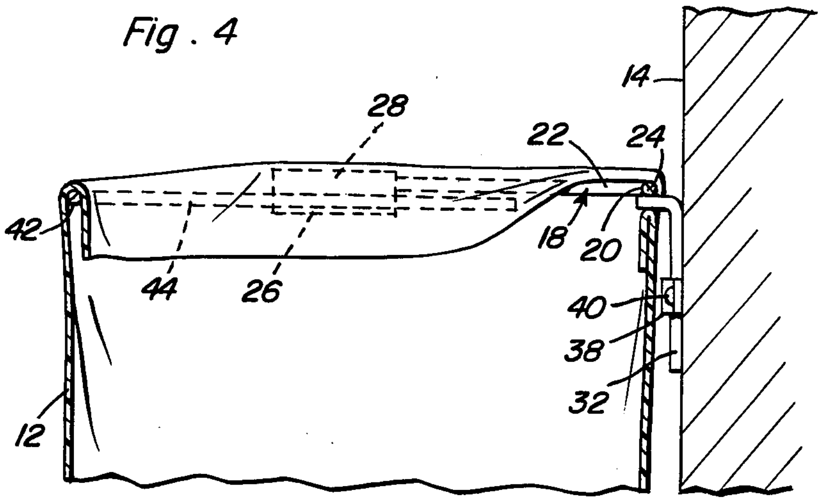
FIG. 4 is an enlarged fragmentary vertical sectional view taken substantially upon the plane indicated by the section line 4—4 of FIG. 1.

The first and second frame sections 20 and 42 are constructed of metallic rod material and are thus bendable for adjustment when needed and resilient to a predetermined degree. In fact, with attention invited to FIG. 5, the base ends of the arms 44 are spaced apart a distance substantially equal to the spacing between the arms 22. Further, the free ends of the arms 44 may be biased toward each other into parallel positions for telescoping into the sleeves 30 and telescopic adjustment relative to the sleeves 30. Accordingly, the spacing between the bight portions 24 and 42 may be adjusted as desired. Further, inasmuch the second section 42 is constructed of a single piece of rod material, when the free ends of the arms 44 are biased toward each other into parallel positions, the bight portion 46 is outwardly bowed intermediate its opposite ends in the manner illustrated in FIG. 6 of the drawings.

Before mounting the frame 18 from the wall 14, a flexible closure panel 50, apertured as at 52 along its base marginal edge portion, is telescoped upwardly over the long legs 36 and positioned on the short legs 34. Thereafter, the frame 18 may be mounted from the wall 14 by means of the clips 38 and fasteners 40 and the section 42 of the frame 18 may be roughly adjusted according to the size of the mouth or open end of the bag 12. The rear marginal edge 54 of the bag 12 may be hooked over the rear corners of the frame 18 defined by the intersections of the arms 18 with the opposite ends of the bight 24 and then the forward marginal edge may be draped over the frame front corners while the ends of the bight portion are being pulled outwardly to expand the frame 18. In this manner, the bag 12 is supported from the frame 18 in a secure manner and the frictional engagement of the free ends of the arms 44 within the sleeves 30 will retain the frame section 42 in its adjusted position relative to the frame section 20. After waste materials have been placed within the bag 12, the closure 50 may be draped over the open top of the bag 12 in the manner illustrated in FIG. 2 of the drawings, the free marginal edge 56 of the closure 50 being provided with an aperture 58 engageable over a suitable hook or nail 60 secured to the wall 14 above the frame 18.

Inasmuch as the frame section 42 may be adjusted relative to the frame section 20, the frame 18 is adaptable for use in conjunction with plastic bags having different sized open ends. Also, the height of the frame 18 may be adjusted along the wall 14 by loosening the fasteners 40, shifting the long legs 36 relative to the clips 38 and then retightening the fasteners 40.

When it is desired to remove the bag 12 after it has been filled, the closure 50 is swung to the open position thereof illustrated in FIG. 1 and engaged with the hook or nail 60. Thereafter, the open top of the filled bag 12 is stripped from the frame 18 and suitable closed for disposal in the conventional manner. Thereafter, a new trash bag 12 may be placed on the frame in a manner which is believed to be obvious from the foregoing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A holder for a bag constructed of somewhat stretchable material such as thin sheet plastic, said holder comprising a closed frame including first and second half sections, said first half section including a pair of generally parallel arms interconnected at one pair of corresponding base ends by means of connecting structure extending and connected therebetween, said one half section including structure adapting it to be supported from a vertical support surface with at least the opposite ends of said connecting structure spaced outwardly from said support surface and the other pair of free ends of said arms projecting horizontally outwardly away from said support surface, said second half section also including a pair of generally parallel arms interconnected at one pair of base ends by a connecting structure extending and connected therebetween, the free ends of said arms of said second half section being inherently resiliently biased toward slightly outwardly divergent positions and yieldable inwardly toward each other into substantially parallel positions aligned with the free ends of the arms of said first section, said free ends of said first and second section arms including portions thereof telescopingly engaged with each other and frictionally retained in relatively telescoped position by the resiliency of said second section tending to return the free ends of the arms thereof toward said outwardly divergent positions thereof.

2. A combination of claim 1 wherein said half sections are each constructed of a single length of rod-like material.

3. The combination of claim 1 wherein the free ends of the arms of one of said frame sections support endwise outwardly opening sleeve defining structures therefrom, the free ends of the arms of the other section being telescopingly received within said sleeve defining structures.

4. The combination of claim 3 wherein said one frame section comprises said first frame section.

5. The combination of claim 1 wherein said second frame section is of one-piece construction and said connecting structure thereof bows outwardly away from the free ends of the arms thereof when said free arms are yieldingly biased toward said substantially parallel positions.

6. The combination of claim 1 including a pair of mounting brackets supported from the connecting structure of said first half section and including a pair of depending shank portions spaced therealong and outwardly of the side of said first section connecting structure remote from the free ends of the corresponding arms, and mounting clips provided for said shank portions and anchoring relatively to a vertical wall surface and relative to which said shank portions are vertically adjustable.

7. The combination of claim 6 including a flexible closure panel having one marginal edge portion thereof supported from said connecting structure of said first half section, said flexible closure panel being displaceable downwardly over the upper portion of said frame with portions of said closure panel overlapping all marginal portions of said frame.

8. The combination of claim 7 including a pair of mounting brackets supported from the connecting structure of said first half section and including a pair of depending shank portions spaced therealong and outwardly of the side of said first section connecting structure remote from the free ends of the corresponding arms, and mounting clips provided for said shank portions and anchoring relatively to a vertical wall surface and relative to which said shank portions are vertically adjustable.

9. The combination of claim 8 wherein said one marginal portion of said flexible closure panel is supported from said mounting brackets.

10. The combination of claim 1 wherein said half sections are each constructed of a single length of rod-like material, said second frame section being of one-piece construction and said connecting structure thereof bows outwardly away from the free ends of the arms thereof when said free arms are yieldingly biased toward said sustantially parallel positions.

11. The combination of claim 10 wherein the free ends of the arms of one of said frame sections support endwise outwardly opening sleeve defining structures therefrom, the free ends of the arms of the other section being telescopingly received within said sleeve defining structures.

* * * * *